United States Patent Office 3,334,103
Patented Aug. 1, 1967

3,334,103
CYCLIC NITROXIDES AND PROCESS FOR PREPARING SAME
Allan Murry Feldman, Norwalk, and Arthur Kentaro Hoffmann, Stamford, Conn., assignors to American Cyanamid Company, Stamford, Conn., a corporation of Maine
No Drawing. Original application June 13, 1962, Ser. No. 202,050. Divided and this application Apr. 26, 1965, Ser. No. 457,899
4 Claims. (Cl. 260—290)

ABSTRACT OF THE DISCLOSURE

Stable free radical nitroxide compounds of the formula

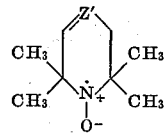

where Z′ is

The compounds are prepared by reaction of an acyl peroxide with a cyclic amine to form an acyl hydroxylamine, followed by alkaline hydrolysis and oxidation.

---

This application is a division of application Ser. No. 202,050, filed June 13, 1962, now abandoned.

This invention relates to new chemical compounds and to a process for preparing the same. More particularly, this invention relates to cyclic nitroxides and to a process for preparing these compounds.

In copending application Ser. No. 129,560, filed Aug. 7, 1961, now U.S. Patent 3,163,677, patented Dec. 29, 1966, a class of N,N-disubstituted nitroxides having the general formula:

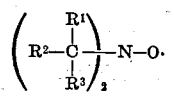

wherein $R^1$, $R^2$ and $R^3$ are each an alkyl radical as described and claimed. These novel compounds are stable free radicals and as such are useful as polymerization inhibitors, antiknock agents in fuels and antioxidants for rubber. Additionally, such N,N-disubstituted nitroxides are useful as traps for reactive free radicals and as paramagnetic standards for electron spin resonance spectrometry.

It has now been discovered that nitroxides wherein the nitrogen atom of the nitroxide group is attached to other than a tertiary carbon of an aliphatic group, i.e., the nitrogen atom forms a part of a heterocyclic nucleus, may be simply and readily prepared from the corresponding heterocyclic amine according to a method which will be more fully described hereinafter. These nitroxides have useful properties similar to those described for the N,N-disubstituted nitroxides of copending application Ser. No. 129,560.

The novel nitroxides of this invention may be represented as:

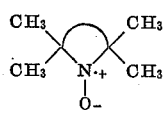

wherein the

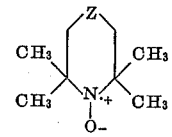

partion represents the residue of a five- or six-membered heterocyclic nucleus.

Accordingly, one of the several classes of novel cyclic nitroxides of this invention may be represented by the following structural formula:

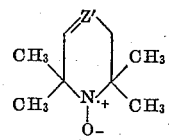

in which Z is selected from the group consisting of $>CH_2$, $>CHCH_3$, $>C=O$, $>CHBr$, $>CHCl$, $>CHI$, $>CHF$, $>CHOH$, $>CHCN$, $>COHCN$, $>CHCOOH$, $>CHCOOCH_3$, $>CHCOOC_2H_5$, $>C(OH)COOC_2H_5$, and $>C(OH)CHOHC_2H_5$ While the above structural representation indicates that the cyclic nitroxides are saturated piperidine derivatives, it is also within the scope of this invention to encompass cyclic nitroxides derived from unsaturated piperidines having the following structural formula:

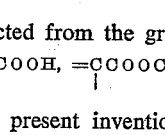

in which Z′ is selected from the group consisting of

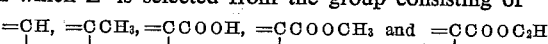

Still further, the present invention relates to a class of cyclic nitroxides derived from five-membered heterocyclic amines, i.e., pyrrolidines. These cyclic nitroxides are of the following structural formula:

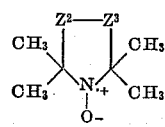

in which $Z^2$ is selected from the group consisting of $>CH_2$, $>C=O$, $C(CH_3)_2$, $>CHCONH_2$, $>CHNH_2$, $>C=NOH$, $>CHOH$, $>C(CN)OH$, $>C(COOCH_3)OH$ and $>C(COOC_2H_5)OH$, and $Z^3$ is $>CH_2$. However, when $Z^2$ is $>C=O$, $Z^3$ may also be selected from the group consisting of $>C=O$, $>C=CH-C_6H_5$, $>CBr_2$ and $>C=NOH$.

Still further, the present invention relates to a class of cyclic nitroxides derived from unsaturated pyrrolidines, i.e., pyrrolines, and having the following structural formula:

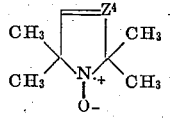

in which $Z^4$ is selected from the group consisting of

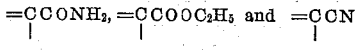

The synthesis for the novel cyclic nitroxides of this invention is believed to be best understood from a consideration of the following course of reaction leading from a five- or six-membered heterocyclic amine to the corresponding cyclic nitroxide. In the scheme,

represents a five- or six-membered heterocyclic amine and

represents an acyl peroxide.

(1) 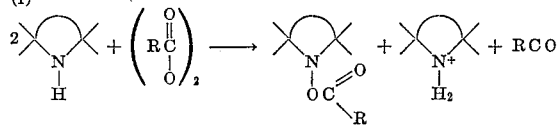

(2) 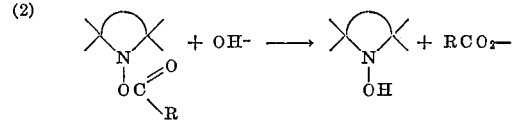

(3) 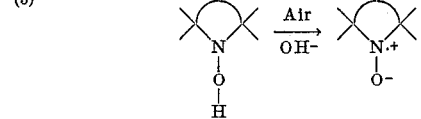

From the above depicted reaction scheme, it will be noted that a five- or six-membered heterocyclic amine is first treated with an acyl peroxide whereby an acyl hydroxylamine is obtained. Although not shown in the series of steps, for the purpose of purification, the acyl hydroxylamine may be converted to its salt with an inorganic acid having the desired anion portion and may be then hydrolyzed to the acyl hydroxylamine. The acyl hydroxylamine is then hydrolyzed in the presence of base to obtain the free hydroxylamine. The hydroxylamine, dissolved in an inert solvent is then converted by oxidation with air, which is usually accomplished in the presence of base, to the cyclic nitroxide. The nitroxide is then isolated by evaporation of the solvent medium.

In general, ambient, i.e., room temperatures, for example, 20° C. to 25° C., and higher will be employed during the synthesis. Thus, the reaction of a heterocyclic amine with an acyl peroxide is generally accomplished at temperatures of from about 20° C. to about 50° C. with temperature of about 35° C. being preferred. The hydrolysis of the acyl hydroxylamine, which is obtained from the immediately mentioned reaction, is best carried out at temperatures from about 50° C. to about 150° C. and preferably at the reflux temperature of an alcohol-water mixture, i.e., from about 70° C. to about 90° C. The conversion of hydroxylamine to the final product, the cyclic nitroxide, is conducted at temperatures from about 20° C. to about 100° C.

Suitable acyl peroxides for use in the preparation of the acyl hydroxylamine include acetyl peroxide, propionyl peroxide, benzoyl peroxide, butyryl peroxide or the like. The hydrolysis of the acyl hydroxylamine to the corresponding free hydroxylamine is accomplished in an alcohol-water mixture, e.g., methanol-water, ethanol-water, propanol-water, or the like, in the presence of a suitable base such as an alkali metal or alkaline earth metal hydroxide including sodium hydroxide, potassium hydroxide, lithium hydroxide, calcium hydroxide, barium hydroxide, magnesium hydroxide or the like. Of these, sodium hydroxide and potassium hydroxide are preferred. While it is usually advantageous to isolate the free hydroxylamine from the hydrolysis mixture before the oxidation of the hydroxylamine to the cyclic nitroxide, this is not always required. In some instances, therefore, the oxidation step may immediately follow the hydrolysis step without isolation or purification of the intermediate hydroxylamine. When desired, the intermediate free hydroxylamine may be purified by conversion to the corresponding hydroxylamine salt by the addition to the free hydroxylamine of a strong organic or inorganic acid such as a hydrogen halide acid, phosphoric acid, sulfuric acid, oxalic acid, picric acid or the like. The hydroxylamine salt is then treated with base, e.g., any of those mentioned immediately hereinabove, to reform the free hydroxylamine. Such purification is not generally necessary, however. Finally, the oxidation of the free hydroxylamine to the cyclic nitroxide is carried out in the presence of an inert solvent, e.g., pentane, ether, benzene, cyclohexane, or toluene, and a base such as an alkali metal or alkaline earth metal hydroxide mentioned hereinabove.

Suitable six-membered heterocyclic amines which may be satisfactorily employed to prepare the novel cyclic nitroxides of this invention are found in the following non-limiting listing:

2,2,6,6-tetramethyl-piperidine,
2,2,6,6-tetramethyl-4-piperidone,
4-bromo-2,2,6,6-tetramethyl-piperidine,
4-chloro-2,2,6,6-tetramethyl-piperidine,
4-iodo-2,2,6,6-tetramethyl-piperidine,
4-fluoro-2,2,6,6-tetramethyl-piperidine,
4-hydroxyl-2,2,6,6-tetramethyl-piperidine,
4-cyano-2,2,6,6-tetramethyl-piperidine,
4-carboxy-2,2,6,6-tetramethyl-piperidine,
4-carbomethoxy-2,2,6,6-tetramethyl-piperidine,
4-carbethoxy-2,2,6-6-tetramethyl-piperidine,
4-cyano-4-hydroxy-2,2,6,6-tetramethyl-piperidine,
4-methyl-2,2,6,6-tetramethyl-piperidine,
4-carbethoxy-4-hydroxy-2,2,6,6-tetramethyl-piperidine,
4-hydroxy-4-(1-hydroxypropyl)-2,2,6,6-tetramethyl-piperidine.

Other piperidines suitable for use in the process of this invention include:

4-methyl-2,2,6,6-tetramethyl-Δ-3-piperidine,
4-carboxy-2,2,6,6-tetramethyl-Δ-3-piperidine,
(4-carboxy-2,2,6,6-tetramethyl-Δ-3-piperidine),
4-carbomethoxy-2,2,6,6-tetramethyl-Δ-3-piperidine and
4-carbethoxy-2,2,6,6-tetramethyl-Δ-3-piperidine.

Suitable five-membered heterocyclic amines which may be employed in the process of this invention are found in the following non-limiting listing:

2,2,5,5-tetramethyl-pyrrolidine,
3,4-diketo-2,2,5,5-tetramethyl-pyrrolidine,
3-keto-4-oximino-2,2,5,5-tetramethyl-pyrrolidine,
3-keto-4-benzylidine-2,2,5,5-tetramethyl-pyrrolidine,
3-keto-4,4-dibromo-2,2,5,5-tetramethyl-pyrrolidine,
2,2,3,3,5,5-hexamethyl-pyrrolidine,
3-carboximido-2,2,5,5-tetramethyl-pyrrolidine,
3-amino-2,2,5,5-tetramethyl-pyrrolidine,
3-oximino-2,2,5,5-tetramethyl-pyrrolidine,
3-hydroxy-2,2,5,5-tetramethyl-pyrrolidine,
3-cyano-3-hydroxy-2,2,5,5-tetramethyl-pyrrolidine,
3-carbomethoxy-3-hydroxy-2,2,5,5-tetramethyl-pyrrolidine and
3-carbethoxy-3-hydroxy-2,2,5,5-tetramethyl-pyrrolidine.

Other pyrrolidines suitable for use in the process of this invention include:

2,2,5,5-tetramethyl-3-carboxamido-Δ-3-pyrroline,
2,2,5,5-tetramethyl-3-carbethoxy-Δ-3-pyrroline, and
2,2,5,5-tetramethyl-3-cyano-Δ-3-pyrroline.

Typical piperidine and pyrrolidine reactants have been described in or are available by methods set forth in Samtleben, Ber. 32, 664 (1899); Franchmiont, Rec. Trav. Chim., 24, 404 (1904); Bretherick et al., Nature, 1707 (1959); Orthner, Ann. 459, 217 (1927); and Ourisson, Bull. Soc. Chim., 345 (1958).

In order to illustrate the principal features of this invention, the following examples are given.

EXAMPLE 1

2,2,6,6-tetramethyl-piperidine nitroxide

A. PREPARATION OF O-BENZOYL HYDROXYLAMINE

Benzoyl peroxide (60.5 gm.; 0.25 M) is dissolved in 1500 cc. diethyl ether. 2,2,6,6-tetramethyl-piperidine (71.2 gm.; 0.505 M) is added and the solution is refluxed until benzoyl peroxide is consumed. As the reaction proceeds the benzoate salt of the amine precipitates. After the reaction is complete, the mixture is cooled, filtered and saturated with dry HCl to precipitate the O-benzoyl hydroxylamine hydrochloride. The solid is filtered off, washed with ether and added to water to decompose the hydrochloride. The product is extracted with ether, dried over $MgSO_4$ and the ether removed in vacuo. The residue is then used directly for the hydrolysis or may be stored for further use.

B. HYDROLYSIS OF O-BENZOYL HYDROXYLAMINE

The product from A is dissolved in 500 cc. methanol. To this is added a solution of 50 gm. sodium hydroxide in 50 cc. water and the mixture is refluxed overnight. One liter of water is then added and the mixture is extracted with ether. The ether is dried over magnesium sulfate, filtered and treated with dry hydrogen chloride to precipitate the hydroxylamine hydrochloride. Isolation of the free hydroxylamine is accomplished by treating a saturated aqueous solution of the hydrochloride with 50% sodium hydroxide and extracting with pentane. Evaporation of the pentane in a stream of nitrogen gives the hydroxylamine. The hydroxylamine, although a solid, is quite volatile and is easily oxidized especially under basic conditions. Isolation of the free base is thus accomplished in the absence of air and the product is stored under nitrogen.

C. OXIDATION OF HYDROXYLAMINE TO NITROXIDE

The hydroxylamine is dissolved in pentane and is allowed to remain in contact with air for several days at room temperature. During this time, the solution is also in contact with solid sodium hydroxide. The solution gradually turns red. After several (2–5) days standing, the oxidation is complete and the product, 2,2,6,6-tetramethyl-piperidine nitroxide, is isolated by evaporation of the solvent.

EXAMPLE 2

2,2,5,5-tetramethyl-pyrrolidine nitroxide

A. PREPARATION OF O-BENZOYL HYDROXYLAMINE

Benzoyl peroxide (60.5 gm.; 0.25 M) is dissolved in 1500 cc. diethyl ether. 2,2,5,5-tetramethylpyrrolidine (64.1 gm.; 0.505 M) is added and the solution is refluxed until the benzoyl peroxide is consumed. As the reaction proceeds, the benzoate salt of the amine precipitates. After the reaction is complete, the mixture is cooled, filtered and saturated with hydrogen chloride to precipitate the O-benzoyl hydroxylamine hydrochloride. The solid is filtered, washed with ether and added to water to decompose the hydrochloride. The product is extracted with ether, dried over magnesium sulfate and the ether removed in vacuo. The residue is then used directly for the hydrolysis.

B. HYDROLYSIS AND OXIDATION

The product from A is dissolved in 500 cc. methanol. To this is added a solution of 50 gm. sodium hydroxide in 50 cc. water and the mixture is refluxed overnight. One liter of water is then added and the ether dried over solid sodium hydroxide for several (2–7) days. The solution gradually turns red due to formation of the nitroxide. After filtering to remove sodium hydroxide, 2,2,5,5-tetramethyl-pyrrolidine nitroxide is isolated by evaporation of the solvent.

While the foregoing invention has been described in conjunction with certain preferred embodiments, it is to be understood that numerous other modifications may be made without departing from the scope of the invention. Consequently, the invention is to be construed broadly and is to be restricted only by the appended claims.

We claim:

1. A cyclic nitroxide of the formula:

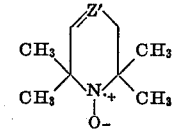

in which Z' is selected from the group consisting of

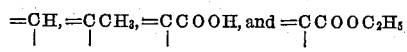

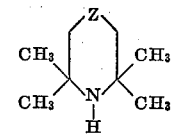

in which Z is as defined hereinabove with an acyl peroxide to form the corresponding acyl hydroxylamine; hydrolyzing said acyl hydroxylamine with base to form the corresponding hydroxylamine; oxidizing with air said hydroxylamine to form the corresponding cyclic nitroxide having the formula as hereinabove and recovering said cyclic nitroxide.

2. A process for preparing a stable free radical cyclic nitroxide of the formula:

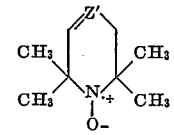

in which Z' is selected from the group consisting of

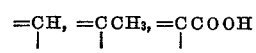

and $=CCOOC_2H_5$ which comprises reacting an amine of the formula:

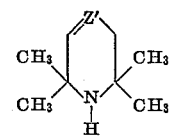

in which Z' is as defined hereinabove with an acyl peroxide to form the corresponding acyl hydroxylamine; hydrolyzing said acyl hydroxylamine with base to form the corresponding hydroxylamine; oxidizing with air said hydroxylamine to form the corresponding cyclic nitroxide having the formula as hereinabove and recovering said cyclic nitroxide.

3. A process for preparing a stable free radical cyclic nitroxide of the formula:

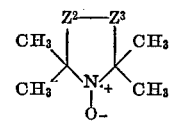

in which $Z^2$ is selected from the group consisting of $>CH_2$, $>C=O$, $>C(CH_3)_2$, $>CHCONH_2$, $>CHNH_2$, $>C=NOH$, $>CHOH$, $>C(CN)OH$, $>C(COOCH_3)OH$ and $>C(COOC_2H_5)OH$, and $Z^3$ is $>CH_2$; however, when $Z^2$ is $>C=O$, $Z^3$ may also be selected from the group consisting of $>C=O$, $>C=CHC_6H_5$, $>CBr_2$ and $>C=NOH$ which comprises reacting by an amine of the formula:

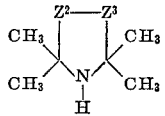

in which $Z^2$ and $Z^3$ are as defined hereinabove with an acyl peroxide to form the corresponding acyl hydroxylamine; hydrolyzing said acyl hydroxylamine with base to form the corresponding hydroxylamine; oxidizing with air said hydroxylamine to form the corresponding cyclic nitroxide having the formula as hereinabove and recovering said cyclic nitroxide.

4. A process for preparing a stable free radical cyclic nitroxide of the formula:

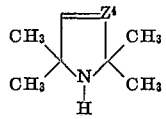

in which $Z^4$ is selected from the group consisting of $>CCONH_2$, $>CCOOC_2H_5$ and $>CCN$ in which $Z^4$ is as defined hereinabove with an acyl peroxide to form the corresponding hydroxylamine; hydrolyzing said acyl hydroxylamine with base to form the corresponding hydroxylamine; and subsequently oxidizing said hydroxylamine to form the corresponding cyclic nitroxide having the formula as hereinabove and recovering said cyclic nitroxide.

References Cited

Pausacker: Australian Journal of Chemistry, vol. 11, pp. 200–210 (1958).

WALTER A. MODANCE, *Primary Examiner.*

A. L. ROTMAN, *Assistant Examiner.*